United States Patent [19]
Johnson

[11] 4,138,659
[45] Feb. 6, 1979

[54] SONIC MOTOR

[76] Inventor: Sven J. Johnson, Main Rd., Southold, N.Y. 11971

[21] Appl. No.: 783,645

[22] Filed: Apr. 1, 1977

[51] Int. Cl.[2] ........................ H04B 13/00; H04B 11/00

[52] U.S. Cl. .................................... 340/8 R; 310/334; 340/10

[58] Field of Search ........................ 340/8 R, 9, 10, 11, 340/12, 14; 310/334, 322

[56] References Cited

U.S. PATENT DOCUMENTS

| | | | |
|---|---|---|---|
| 2,497,852 | 2/1950 | Arenstein | 340/2 |
| 2,962,695 | 11/1960 | Harris | 340/11 X |
| 3,150,346 | 9/1964 | Polly et al. | 340/10 X |
| 3,354,426 | 11/1967 | Massa | 340/10 |
| 3,460,061 | 8/1969 | Massa | 340/10 X |
| 3,543,230 | 11/1970 | Massa | 340/10 |
| 3,560,771 | 2/1971 | Baker, Jr. | 310/322 |
| 3,583,677 | 6/1971 | Phillips | 340/10 X |

*Primary Examiner*—Harold Tudor
*Attorney, Agent, or Firm*—Leonard W. Suroff

[57] ABSTRACT

A sonic motor comprising housing means with a closure at each end thereof and having an axially extending cavity therein, with a transmission member having spaced apart surfaces with a cylindrical output end the diameter of which substantially matches the diameter of said cavity. Coupling means connects the transmission member to the housing means so as to maintain the output end of the transmission member in energy transmitting relationship to the housing means, and transducer means is connected to one of the surfaces on the transmission member substantially centrally thereof to provide longitudinal mechanical vibrations thereto, so as to cause the transmission member to vibrate in a radial mode such that the housing means in the area of the coupling means is radially vibrated. The motor is also adapted to be self powered for use in underwater applications.

17 Claims, 8 Drawing Figures

SONIC MOTOR

BACKGROUND OF THE INVENTION

The present invention relates to the general field of sonic energy, and more particularly relates to a sonic motor and system adaptable for a variety of uses.

Sonic energy is utilized in a number of fields, and the term "sonic" as defined herein is intended to include the frequency range from 1 KHz to 1,000 KHz. In all of these applications a sonic motor is utilized that converts electrical energy to sonic mechanical vibrations. The prior art illustrates a number of patents defining various types of motors adapted for particular uses. Certain of the sonic applications require a motor that produces radially directed mechanical vibrations which are coupled or transmitted to a surrounding medium. In the area of underwater technology this medium is generally water that transmits these radially directed beams of energy for various uses well known in the art.

Prior to the present invention these radially directed vibrations utilized in a device to act as a sonic beacon buoy, etc., in a sea water environment, as well as other applications, utilized a transducer that was vibrated in a radial mode. To obtain the vibration of the transducer, generally made from a piezoelectric element, either a cylindrical tubular element was used or a flat disc having a circular peripheral surface. A piezoelectric element formed as a cylinder or a disc can be vibrated in a radial mode in accordance with well known characteristics.

It has been found in accordance with the present invention that the drawbacks of utilizing a cylindrical or disc shaped piezoelectric crystal or element can be avoided by the utilization of a longitudinally vibrating transducer and a means for transforming the mechanical vibrations through a transmission member into radial vibrations at a loop of longitudinal vibration. By being able to accomplish this transmission in an efficient manner, the problems associated with a cylindrical or disc shaped element is avoided. For example, when vibrating a piezoelectric element in a radial mode, the coupling coefficient is generally relatively low since a loss of energy occurs through the bonding agent that has to be employed. This low efficiency factor requires a larger power source in order to obtain the same output amplitude of the motor.

Applicant has now discovered that longitudinal vibrations may be utilized to vibrate a cylindrical transmission member coupled to the transducer at a loop of longitudinal vibration which is then transformed into radial vibrations in the transmission member and in turn coupled to the housing means of the motor with a high energy efficiency.

The sonic motor of the present invention has found ideal usage in devices as locaters or position indicators in connection with underwater objects, or as safety or rescue devices in connection with sea water. The principles of the invention may be used in any useful way, whether or not in a device for use on or in the sea.

In accordance with one aspect of this invention, the sonic motor may be incorporated in a device or system which is automatically activated when positioned in sea water. For example, a device made in accordance with the invention may be stored for long periods of time and be freshly activated by the addition of a salt water solution at the time use is desired.

The self-powered sonic marker, beacon, or buoy comprises a sea water powered sonic transmitter for undersea applications where a site, a structure, equipment such as pipe lines, cables, fishing trawls, wrecks, etc., or any other object might normally be difficult to locate. The sonic marker buoy transmits sonic energy either as a continuous sinusoidal wave or as intermittent bursts of waves occurring at a predetermined number of bursts or pulses per second. By placing this marker as a buoy on or in the vicinity of such a site, etc., the use of a receiver capable of detecting this sonic energy will aid in localizing the object so marked.

The invention, as it relates to underwater uses, is unique in that it does not employ a battery (in the everyday concept of a dry cell, etc.) to power its electronic circuitry but utilizes the electrical voltage produced when two dissimilar metals such as copper and magnesium are immersed in a salt solution such as sea water. It therefore does not depend on the limited life of a storage cell or other forms of batteries normally used for powering electrical circuits. The marker buoy has a useful life governed only by the corrosion by sea water of the magnesium electrode. In practical applications and configurations, it appears that a useful life of several years can be expected from a marker buoy such as described herein.

The ability to increase the efficiency of the system by transforming the longitudinal motion to radially directed vibrations that is easily coupled to the housing means containing the transducer means forming part of the motor greatly increases the acoustical efficiency of the device.

OBJECTS OF THE INVENTION

An object of the invention is to provide an improved construction of a sonic motor.

Another object of the invention is to provide a new and improved structural arrangement in an electromechanical motor for radially vibrating a transmission member.

Another object of the invention is to provide a new and novel sonic beacon for underwater use that includes a sonic motor incorporating the features of the present invention.

Another object of the invention is to provide a sonic motor in which longitudinal vibrations from a loop of motion is converted to radial vibrations at the same frequency of the longitudinal vibrations.

Another object of the invention is to provide a sonic motor in which the radial output frequency is approximately twice the frequency of the longitudinal vibrations utilized.

Other objects and advantages of the present invention will become apparent as the disclosure proceeds.

SUMMARY OF THE INVENTION

The present invention combines a number of elements to obtain the new and novel sonic motor described herein. The sonic motor comprises housing means with a closure at each end thereof and having an axially extending cavity therein, with a transmission member having spaced apart surfaces with a cylindrical output end the diameter of which substantially matches the diameter of said cavity. Coupling means connects the transmission member to the housing means so as to maintain the output end of the transmission member in energy transmitting relationship to the housing means, and transducer means is connected to one of the surfaces on the transmission member substantially centrally thereof to provide longitudinal mechanical vibrations thereto, so as to cause the transmission member to vibrate in a radial mode such that the housing means in the area of the coupling means is radially vibrated.

The transmission member may be designed such that the radial vibration at the output end thereof, are at a frequency substantially equal to the frequency of the transducer means. If desired, the frequency at the output end of the transducer means may be increased to approximately twice the frequency of the transducer means. The sonic motor may be incorporated in a beacon or the like that is adapted to be self powered for use in underwater applications.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a front view, partially in cross section, of a sonic motor according to the present invention incorporated in a beacon or the like;

DETAILED DESCRIPTION OF THE DRAWINGS

Figure 1:
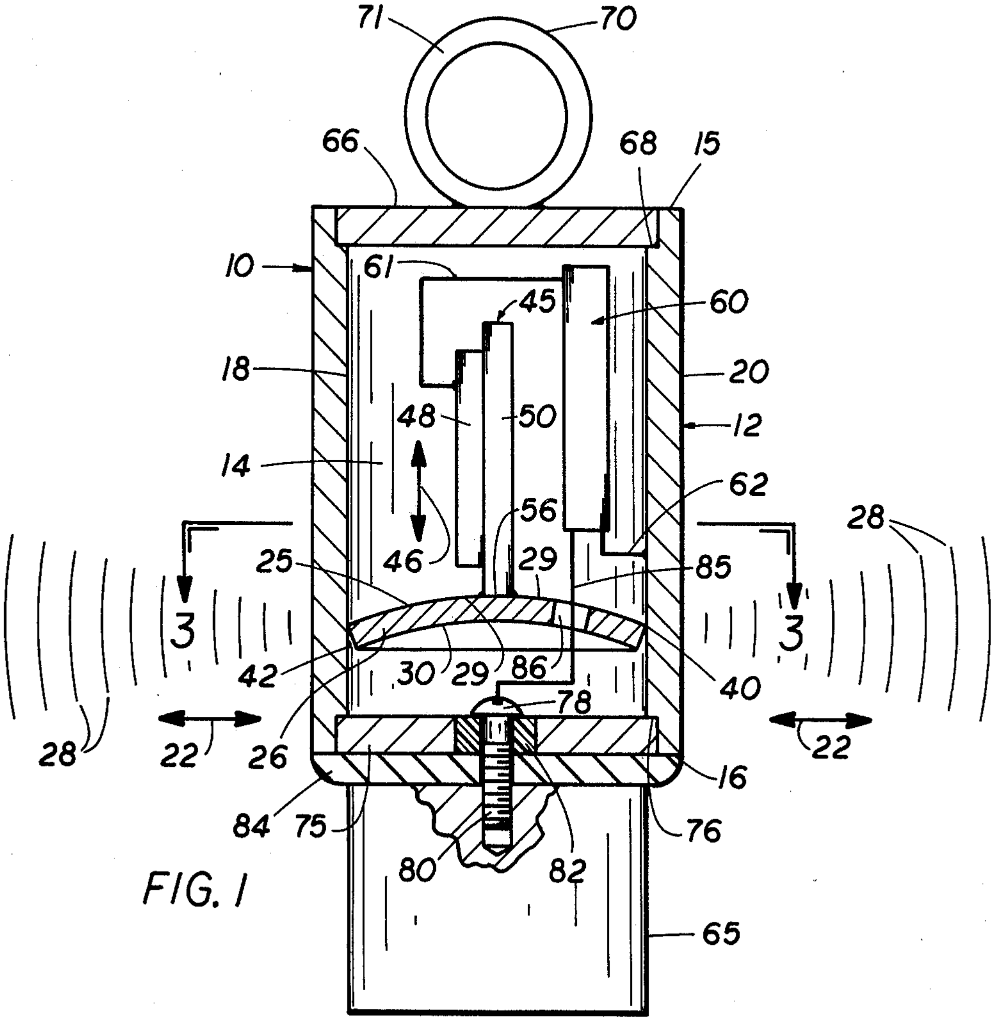
Figure 2:
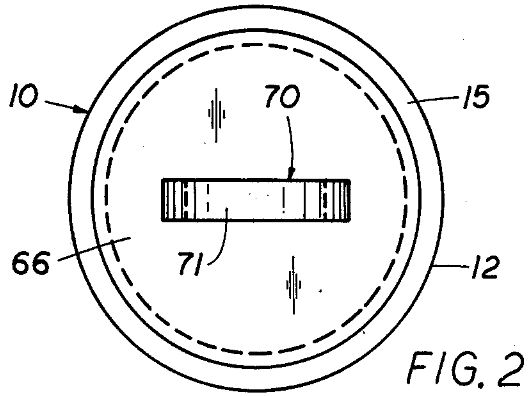
FIG. 2 is a top view of the motor illustrated in FIG. 1.
Figure 3:
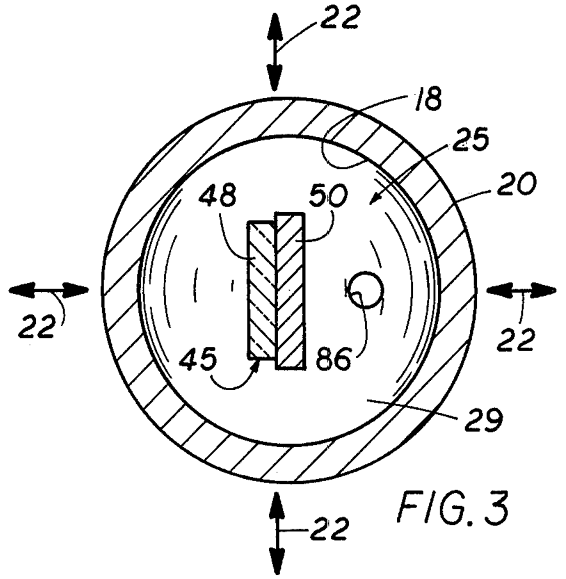
FIG. 3 is a sectional view taken along line 3—3 of FIG. 1.

Referring now to the drawings and initially to FIGS. 1–4 thereof, there is illustrated one embodiment of the present invention that includes a sonic motor or transmission system generally referred to by numeral 10. The motor 10 includes housing means 12 that may be manufactured from metallic or plastic material and of a tubular configuration having an axially extending cavity 14 within the housing means 12. The housing means includes an upper end or top 15 and a lower end or bottom 16 in spaced relationship to each other, with a vertically extending inner wall 18 and outer wall 20. The inner wall 18 is generally of circular configuration, as is the outer wall surface 20 with the respective walls 18 and 20 coaxial with each other. The axial length of the housing means 12 will vary depending upon the application to which the motor 10 is to be utilized.

In order to obtain, or induce, the outer wall surface 20 to vibrate in a radial mode as illustrated by arrows 22, transmission means 25 is utilized and positioned within the cavity 14. The transmission means includes a transmission member 26 which when excited will vibrate radially, which vibrations are in turn coupled to the inner wall 18 and radiated from the outer wall 20. Depending upon the application of the motor 10, it may be immersed in a liquid, in which case the pulses of radial energy will be in the form of waves 28 extending outwardly from the wall 20.

Figure 4:
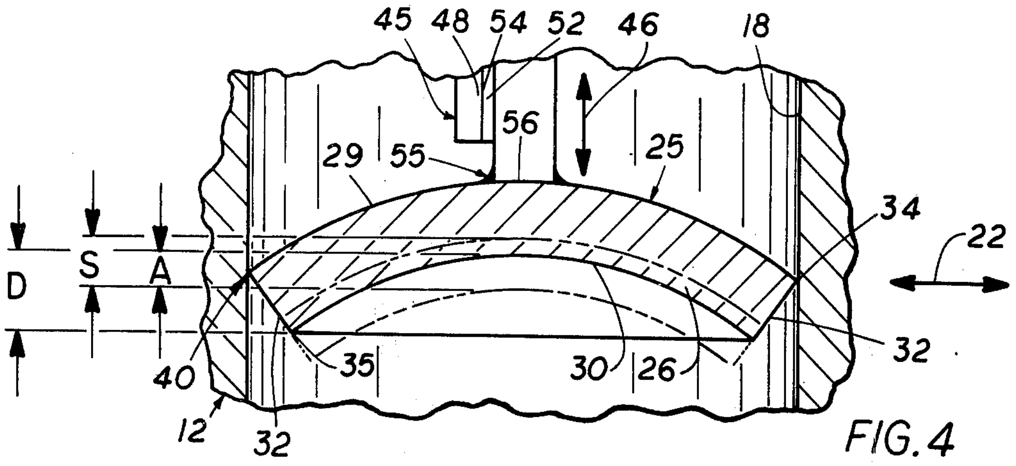
FIG. 4 is an enlarged fragmentary view of the transmission member in accordance with one embodiment of the present invention.

For those applications that the motor 10 is not utilized in connection with a liquid, then the radial vibrations 28 may be coupled via a third medium or directly to a work object. The transmission member 26 has spaced apart surfaces which include an upper surface 29 and a lower surface 30. As seen in FIG. 4, the surfaces 29 and 30 terminate in a conical output end 32 which, due to the particular contour of the transmission member 26, includes an upper end 34 and lower end 35. The upper output end 34 is cylindrical and of a diameter which substantially conforms with the diameter defined by the inner wall 18 of the housing means 12. As is well known in the art to transmit sonic mechanical vibrations a coupling is required for the transmission. Accordingly, coupling means 40 is utilized to obtain this end result.

The coupling means 40 connects the transmission member 26 to the housing means 12 so as to maintain the output end 32 in energy transmitting relationship to the housing means 12. The coupling means 40 may take various forms starting with a press fit relationship between the upper margin 34 and the inner wall 18. In addition the coupling means 40 may include a brazed or soldered joint 42 for mechanically joining the transmission member 26 to the inner wall 18. Depending upon the power requirements, and the particular materials involved, the joint 42 may be from an epoxy or other bonding agent well known in the art. The transition member 26 can be made thick so that proper radial amplitude is obtained.

In contrast to prior art devices, applicant has now discovered that it is possible to vibrate the transmission means 25 in a radial mode to excite the outer wall 20. He has further discovered that the frequency at which the outer wall 20 is vibrated may be varied by the configuration of the transmission member 26. In particular, as illustrated in FIG. 4, surfaces 29 and 30 are concave relative to the transducer means 45 utilized to power and drive the transmission means 25. By providing a concave configuration having certain parameters, applicant has found that the frequency f-1 of the transducer means 45 may be equal to the output frequency f-2 at the output surface 20 of the housing means 12. This is obtained by driving the transmission member 26 in a longitudinal direction as illustrated by double headed arrow 46. Arrow 46 in effect designates the total excursion or stroke, S, of the forward end of the transducer means 45. One-half of the stroke, S, is designated by the amplitude, A.

As illustrated in FIG. 4, the angle of curvature of the lower surface 30 is defined by the dimension, D. This dimension is defined as the distance between the surface 30 at substantially its innermost point of the spherical contour that it defines and the lower margin 35. Applicant has discovered that if the amplitude, A, illustrated to extend downwardly of the lower surface 30 by the phantom line, is less than the dimension, D, then f-1 is substantially equal to f-2.

Applicant has also discovered that the transmission means 25 can accomplish what has heretofore been the transducer itself located across the diameter of the inner wall 18. The prior art devices, as explained above, utilize a radially vibrating transducer which had a considerable number of inherent problems. The problems related to the ability to couple a circular disc or cylinder to the inner wall 18 without considerable loss of efficiency. Due to the manufacturing procedures of piezoelectric elements, the ability to maintain concentricity is always a problem. Furthermore, the bonding of the crystal directly to the inner wall 18 has always led to considerable losses in energy transmission. The discovery of applicant that longitudinal vibrations, at approximately a loop, can be transmitted to excite a transmission member in a radial mode is a major step forward in the sonic motor art.

The transducer means 45 may take various forms and shapes and be either piezoelectric or magnetostrictive in nature and longitudinally dimensioned so as to have lengths which are whole multiples of quarter wavelengths of the compressional waves established therein at the frequency of the alternating current so that longitudinal loops of motion occur at one, or both, ends thereof. The transducer means 45 includes a driving element 48 that is excited to vibrate. As illustrated in FIGS. 1 and 4, the driving element 48 may be from a piezoelectric material and combined with an elongated support or transmitting member 50 that acts in a piston-like manner to accomplish the desired end results.

As illustrated in FIG. 4, bonding means 52 is utilized to mechanically couple the inner surface 54 of the driving element 48. The bonding means 52 may be in the form of an epoxy well known in the art. In this manner when the driving element 48 is longitudinally excited in a plane substantially normal to the transmission member 26, these vibrations will be imparted to the support member 50 and in turn to the transmission member 26. Mounting means 55 may be utilized to couple the forward end 56 of the support member 50 to the upper surface 29. A screw thread may be utilized or if desired an epoxy, brazing, or soldering may be utilized.

Accordingly, the elongated piezoelectric element 48 is bonded at one end or surface 54 to the transmission member 26 by means of the support member 50. The configuration of the driving element 48 and support member 50 is such that the optimum amplitude of longitudinal vibration and hyperaccelerations is achieved. Of particular interest, is that applicant has now discovered that radial vibrations in the transmission member 26 may be obtained from the loop end of the transducer means 45. It has become known to place a disc-like element at the node of a longitudinal vibrator where the radial amplitude is at a maximum and the longitudinal motion is substantially zero. Applicant has now discovered that in contrast to the above, the coupling at a loop of longitudinal motion can excite the transmission means in a radial mode. Furthermore, the frequency at the loop of radial vibration of the transmission means may be equal to the frequency of the longitudinal mechanical vibration, or approximately double the frequency as hereinafter discussed.

To power the transducer means 45, an electronic generator or converter means 60 is utilized and may be designed to generate electrical energy at a desired frequency in the range of 1 KHz to 1,000 KHz. The converter 60 may include an electrical circuit known in the art that will produce short bursts of oscillations and transmitted by lead 61 to the driving element 48 to excite same. Lead 62 grounds the converter 60 to the housing means 12.

The converter means 60 is in turn connected to a source of electrical energy which may be a conventional wall outlet, a battery, or for underwater uses a power source 65 may be utilized wherein the electrical voltage is produced when two dissimilar metals such as copper and magnesium are immersed in a salt solution such as sea water. In this manner a sonic beacon is obtained by employing parts for the outer shell or housing 12 along with a special electrode of the power source 65 such that a simple battery is formed when the beacon illustrated in FIG. 1 is immersed in sea water and even in most bodies of fresh water.

When the motor 10 is to be utilized for underwater applications, an upper closure or cover 66 is provided at the upper end 15 of the housing means 12. The upper closure 66 may extend in a recess or seat 68 provided therefor, and the seal may be liquid proof by using the proper sealing agent. Attachment means 70 may be secured to the upper closure 66 and may be in the form of a ring 71 to facilitate securing a line thereto for immersion.

A lower closure 75 may be provided adjacent the bottom end 16 of the housing means 12 and contained in a seat or recess that is provided. The joint therebetween is sealed to be liquid tight for immersion purposes. As seen in FIG. 1, a connecting fastener 78 is provided having a threaded section 80 that extends through the lower closure 75 with a sealing bushing or material 82 which may also act to insulate the fastener 78 from the housing means 12.

An additional layer of insulation and sealing material 84 may be employed at the lower end 16. In this manner the power source 65 is readily replaced from its coupling engagement with the threaded portion 80 of fastener 78. A lead 85 extends between the converter 60 and the fastener 78. The lead may extend through an opening 86 in the transmission member 26. The power source 65 operates to power the converter 60 in a manner well known in that the sea water acts as the electrolyte liquid and the metals of the housing means 12 and power source 65 operate in an interrelated manner such that unrestricted access to at least a portion of the metals is obtained when they are immersed in the liquid. The different metals are comprised as electrodes freely accessible to the liquid which are adapted to close an electric circuit when placed within the liquid. When removed from the liquid, the motor 10 automatically ceases to operate or is deactivated.

Accordingly, FIGS. 1–4 illustrate one form of a sonic system capable of producing radial vibration at an amplitude of vibration for performing useful work. It is appreciated that the electronic generator 60 may be mounted externally of the housing means and that various other forms of powering same may be provided.

Figure 5:
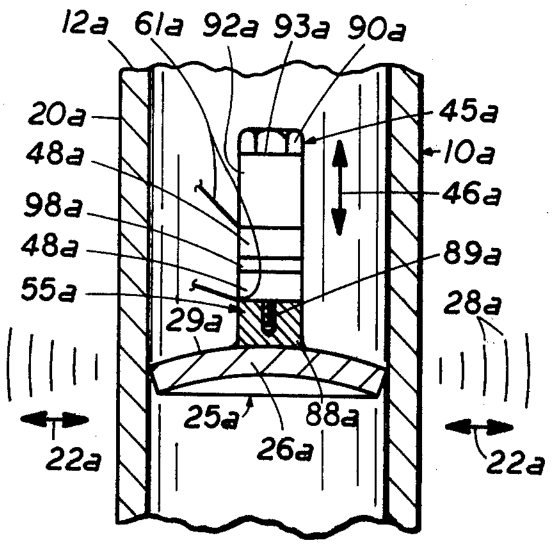
FIG. 5 is a sectional view illustrating another form of transducer means that may be utilized with the sonic motor of the present invention.

FIG. 5 illustrates another embodiment of the present invention in which the sonic motor *10a* includes housing means *12a* in which the transducer means *45a* is of a different form in order to induce vibration in the transmission means *25a* to obtain the energy waves *28a* circumferentially of the outer surface *20a* in the radial mode, as illustrated by arrows *22a*.

The transducer means *45a* generates longitudinal vibrations illustrated by arrow *46a* and may include a mounting block or member *88a* which may be integrally formed with or secured to the upper surface *29a* of the transmission member *26a*. The mounting means *55a* may include a threaded stud *89a* extending from a bolt *90a*. The bolt *90a* acts to compress a pair of disc-like driving elements *48a* having a washer *91a*. A rear mounting block *92a* is spaced between the upper driving element *48a* and the bolt head undersurface *93a*. In this manner a sandwich type piezoelectric transducer means 45$a$ is obtained and is adapted by leads 61$a$ to be excited and driven in a longitudinal mode. The end result at the output end 32$a$ is as previously explained with respect to FIGS. 1-4.

Figure 6:
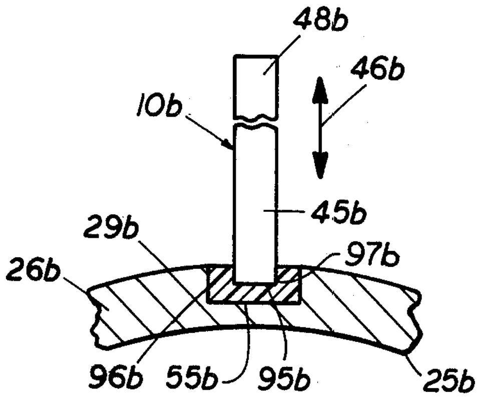
FIG. 6 is a fragmentary sectional view illustrating another form of transducer means that may be utilized with the sonic motor of the present invention.

FIG. 6 illustrates another embodiment of the motor 10$b$ in which the transducer means 45$b$ includes a driving element 48$b$ in which the front end thereof 95$b$ is coupled to the transmission means 25$b$ without any intermediary support. The mounting means 55$b$ may be in the form of a bonding agent 96$b$ provided in a cavity or recess 97$b$ in the upper surface 28$b$ of transmission member 26$b$. In this way a simple mounting relationship may be obtained in order that the longitudinal vibration 46$b$ is maintained. The driving element 48$b$ is in turn connected to the electronics as discussed above.

Figure 7:
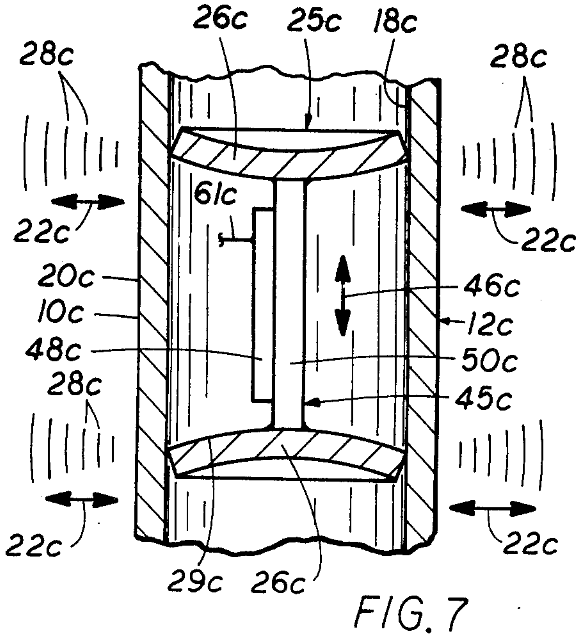
FIGS. 7 and 8 are sectional views of additional embodiments of the sonic motor of the present invention.

FIG. 7 illustrates another embodiment of the motor 10$c$ in which the housing means 12$c$ at the outer surface 20$c$ is radially vibrated as illustrated by doubled headed arrows 22$c$ at spaced locations, vertically from each other, to produce the waves 28$c$. There are those applications in which a greater energy concentration is required, and the present invention provides and permits the obtainment of radial vibrations from spaced apart locations with single transducer means 45$c$. Each end of the support member 50$c$ acts as a loop of motion and is coupled to the upper surface 29$c$ of each transmission member 26$c$. As previously explained, the excitement of the driving element 48$c$ by lead 61$c$ obtains the necessary amplitude of motion illustrated by arrow 46$c$. Depending upon the thickness between the inner wall 18$c$ and outer wall 20$c$, the substantial entire axial length of the housing means 12$c$ may be vibrated in the radial mode. The prior art devices would require two driving elements to accomplish what is illustrated in FIG. 7.

Figure 8:
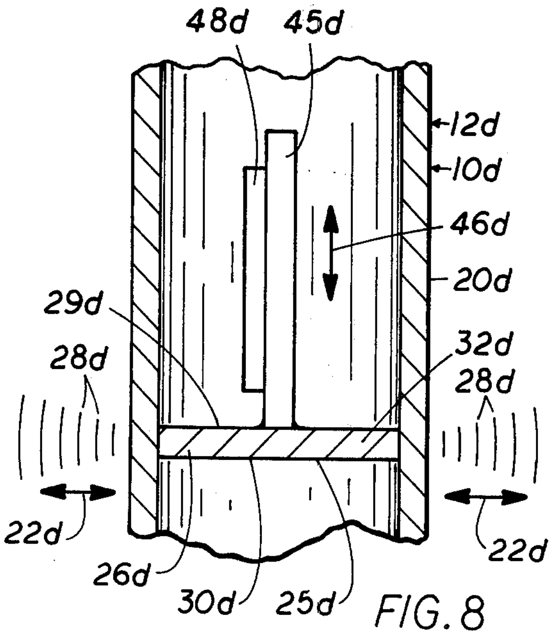

FIG. 8 illustrates another embodiment of the present invention and applicant has discovered that the output frequency of the outer wall 20$d$ of housing means 12$d$ may exceed the longitudinal frequency of vibration of transducer means 45$d$ obtained by driving element 48$d$. As seen, transmission means 25$d$ has spaced apart surfaces 29$d$ and 30$d$ with an output end 32$d$ that is in a plane substantially normal thereto. Applicant has discovered that when the surfaces 29$d$ and 30$d$ of transmission member 26$d$ are substantially flat and not concave, as illustrated with respect to FIG. 4, that the frequency f-1 indicated by arrow 46$d$ can be one-half the frequency f-3 illustrated by arrows 22$d$ for the waves 28$d$. To put it another way, frequency f-3 can be approximately twice the frequency of f-1 if the spaced apart surfaces 29$d$ and 30$d$ are flat and extend in substantially parallel spaced relationship to each other.

This discovery is important in that additional flexibility is obtainable in the design and construction of motors incorporating the principles of the present invention. The alternate embodiments of the transducer means illustrated in FIGS. 5 and 6 may be utilized with the embodiment of the invention illustrated in FIG. 8. In addition, the aspect of the invention illustrated in FIG. 7 may be also incorporated in the embodiment of FIG. 8.

The transition member can be made thick so that the piston mode of the sonic motor is converted to a radial mode due to the elastic properties of the member as expressed by the elastic constant known as Poisson's ratio, in which a compression along one axis is accompanied by a dilation at right angles to it.

The use of a precious metal coating on the outside of the sonic beacon to prevent seawater reaction with the metal forming chemical compounds which result in lowered potential between the two metals comprising the seawater battery is also within the scope of the present invention.

Although illustrative embodiments of the invention have been described in detail herein with reference to the accompanying drawings, it is to be understood that the invention is not limited to the precise embodiments and that various changes and modifications may be effected therein without departing from the scope or spirit of the invention.

I claim:

1. A sonic motor comprising:

a. housing means having an axially extending cylindrical cavity defining a diameter therein, b. a transmission member having spaced apart surfaces with an output end the diameter of which substantially conforms with the diameter of said cavity, c. coupling means connecting said transmission member to said housing means so as to maintain said output end of said transmission member in energy transmitting relationship to said housing means, d. transducer means connected to one of said surfaces on said transmission member at a loop of longitudinal mechanical vibration, and substantially centrally thereof to provide longitudinal mechanical vibrations so as to cause said transmission member to vibrate in a radial mode such that said housing means in the area of said coupling means is radially vibrated, e. said transducer means includes:

(i) an elongated support member having one end thereof connected to said transmission member, and (ii) a piezoelectric element mechanically joined to said support member and adapted to be longitudinally vibrated in a plane substantially normal to said transmission member so as to obtain mechanical vibration of said support member longitudinally thereof so as to transmit said vibrations to said transmission member such that said transmission member is vibrated in said radial mode, and f. said transmission member having a concave configuration between said spaced apart surfaces with said concave surfaces extending outwardly from said transmission member, and said angle of said concave surfaces adapted to obtain radial vibration at said output end at a frequency related to the frequency of vibration generated by said transducer means.

2. A sonic motor as in claim 1, wherein said transducer means is adapted to vibrate said transmission member in the range of 1 KHz to 1,000 KHz.

3. A sonic motor as in claim 1, wherein said output end of said transmission member is vibrated at a loop of radial vibration.

4. A sonic motor as in claim 1, wherein said coupling means includes a brazed or soldered joint for mechanically joining said transmission member to said housing means.

5. A sonic motor as in claim 1, wherein said coupling means includes an epoxy joint for mechanically joining said transmission member to said housing means.

6. A sonic motor as in claim 1, wherein said transducer means and said output end of said transmission member vibrate at substantially the same frequency of vibration.

7. A sonic motor as in claim 1, and further including a converter in said housing means coupled to said transducer means for powering same.

8. A sonic motor as in claim 7, wherein said converter is adapted to be powered by a power source in the form of a battery.

9. A sonic motor as in claim 7, wherein said converter is adapted to be powered by a power source comprising different metals relatively far apart on the electromotive series in combination with an electrolyte comprising a liquid.

10. A sonic motor as in claim 1, and further including closure means at each end of said housing means.

11. A sonic motor as in claim 10, wherein said closure means is liquid proof such that the sonic motor may be immersed in a liquid.

12. A sonic motor as in claim 10, and further including attachment means connected to one of said closure means.

13. A sonic motor as in claim 10, and further including a power source connected to one of said closure means and coupled to said transducer means for powering same.

14. A sonic motor as in claim 1, wherein said mounting means includes an epoxy or the like.

15. A sonic motor comprising:

a. housing means having an axially extending cylindrical cavity defining a diameter therein, b. transmission means including a transmission member having spaced apart surfaces with an output end the diameter of which substantially conforms with the diameter of said cavity, c. coupling means connecting said transmission member to said housing means so as to maintain said output end of said transmission member in energy transmitting relationship to said housing means, d. transducer means adapted to be vibrated in the frequency range of 1 KHz to 1,000 KHz, said transducer means including a piezoelectric driving element and a support member bonded to each other, said transducer means being joined to said transmission member at a loop of longitudinal mechanical vibration, e. mounting means for mechanically joining said support member of said transducer means to one of said surfaces on said transmission member substantially centrally thereof, so as to cause said transmission member to vibrate in a radial mode such that said housing means in the area of said coupling means is radially vibrated, f. converter means electrically connected to said transducer means for powering same, g. said transmission member having a concave configuration between said spaced apart surfaces with said concave surfaces extending outwardly from said transmission member, and said angle of said concave surfaces adapted to obtain radial vibration at said output end at substantially the same frequency of vibration generated by said transducer means, and h. said transducer means including (i) an elongated support member having one end thereof connected to said transmission member by said mounting means, and (ii) a piezoelectric element mechanically joined to said support member and adapted to be longitudinally vibrated in a plane substantially normal to said transmission member so as to obtain mechanical vibration of said support member longitudinally thereof so as to transmit said vibrations to said transmission member such that said transmission member is vibrated in a radial mode.

16. A sonic beacon or the like comprising:

a. housing means having an axially extending diameter defining a cavity therein with a circular inner and outer wall, b. a transmission member having spaced apart surfaces with an output end the diameter of which substantially conforms to the diameter of said cavity, c. coupling means connecting said transmission member to said inner wall of said housing means so as to maintain said output end of said member in energy transmission relationship to said housing means, d. transducer means connected to one of said surfaces on said transmission member substantially centrally thereof to provide longitudinal mechanical vibrations, so as to cause said transmission member to vibrate in a radial mode such that said outer wall of said housing means in the area of said coupling means is radially vibrated, e. an upper liquid proof closure at the upper end of said housing means, f. a lower liquid proof closure at the lower end of said housing means, g. a converter positioned within said housing means and coupled to said transducer means for powering same at a sonic rate, h. a power source secured to said lower closure and electrically coupled to said converter means, such that when activated said power source supplies sufficient electrical energy to drive said transducer means to transmit through said transmission member radial vibrations to the surrounding medium, i. said transmission member having a concave configuration between said spaced apart surfaces with said concave surfaces extending outwardly from said transmission member, and said angle of said concave surfaces adapted to obtain radial vibration at said output end at a frequency related to the frequency of vibration generated by said transucer means, j. said transducer means being joined to said transmission member at a loop of longitudinal mechanical vibration, k. said longitudinal amplitude of vibration is less than the vertical distance between the center of said concave surfaces and the outer margin thereof, and l. said transducer means including:

(i) an elongated support member having one end thereof connected to said transmission member, and (ii) a piezoelectric element mechanically joined to said support member and adapted to be longitudinally vibrated in a plane substantially normal to said transmission member so as to obtain mechanical vibration of said support member longitudinally thereof so as to transmit said vibrations to said transmission member such that said transmission member is vibrated in a radial mode.

17. A sonic beacon as in claim 16, and further including mounting means for mechanically joining said transducer means to said transmission member.

* * * * *